March 11, 1941.   R. H. FLEET ET AL   2,234,751
TAKE-OFF CONTROL AND METHOD
Original Filed April 24, 1937   4 Sheets-Sheet 3

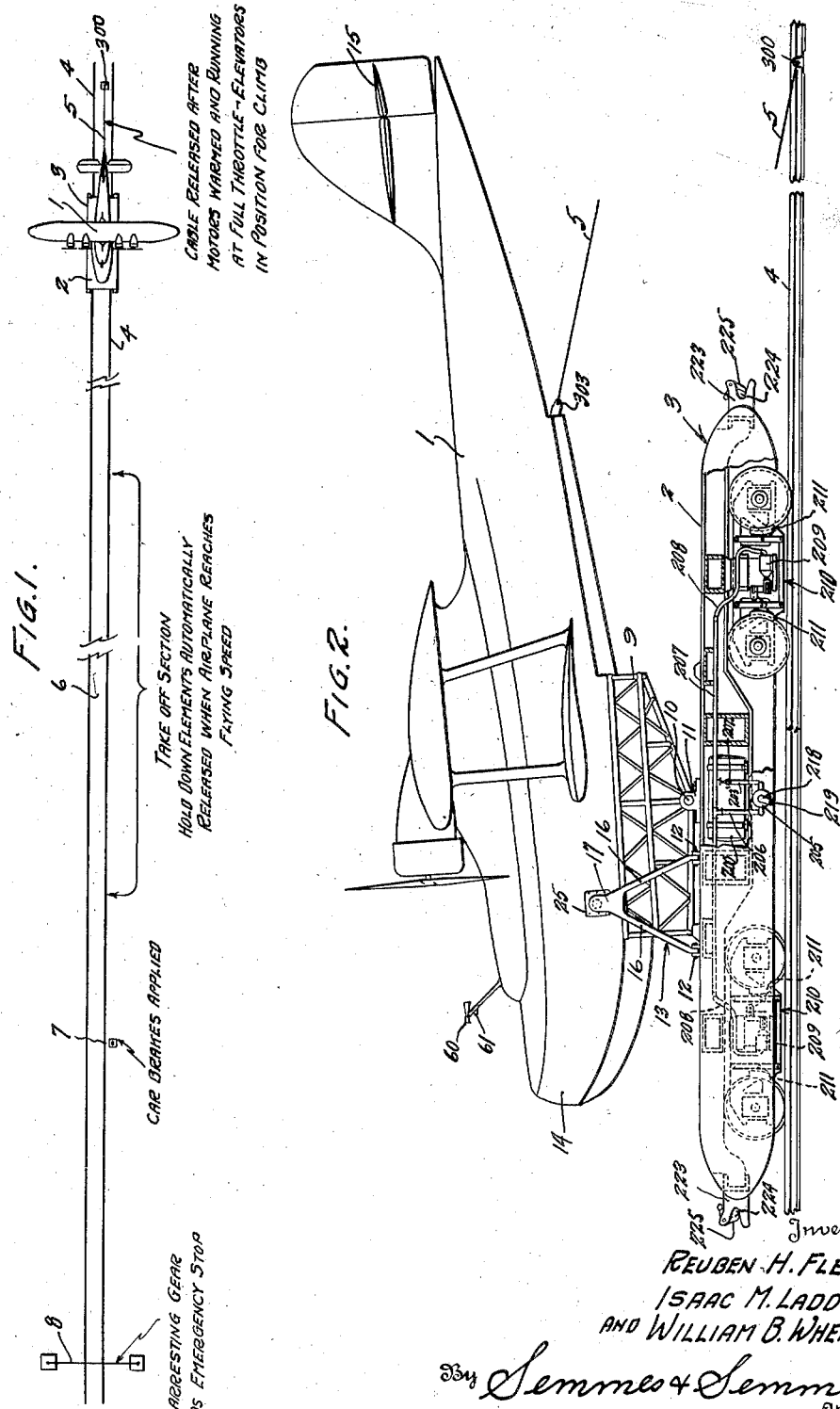

Inventors
REUBEN H. FLEET,
ISAAC M. LADDON
AND WILLIAM B. WHEATLEY
By Semmes & Semmes
Attorneys March 11, 1941.　　R. H. FLEET ET AL　　2,234,751
TAKE-OFF CONTROL AND METHOD
Original Filed April 24, 1937　　4 Sheets-Sheet 2
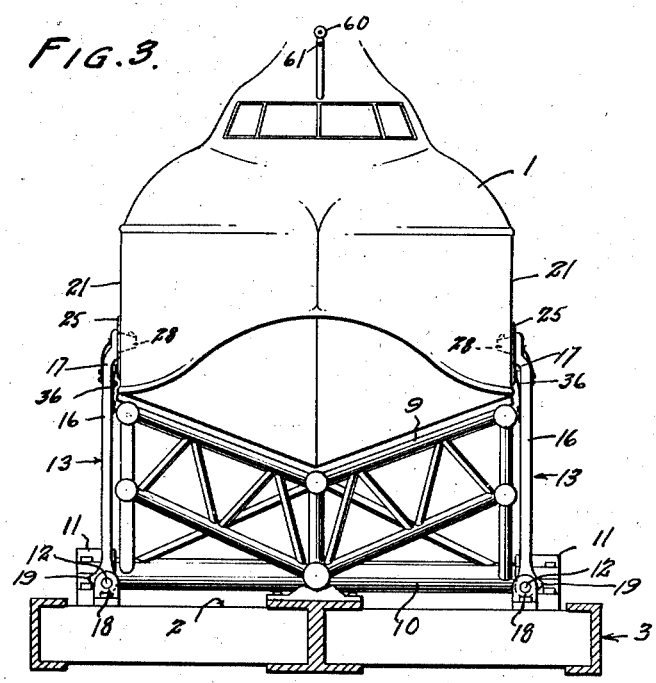
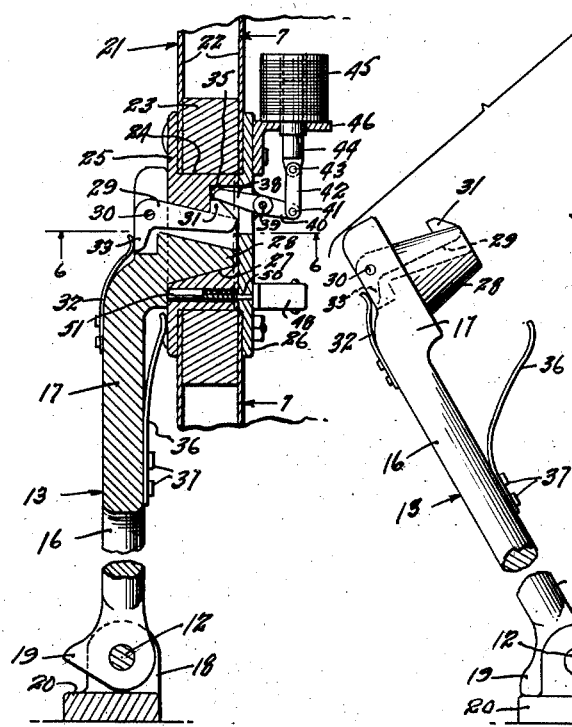
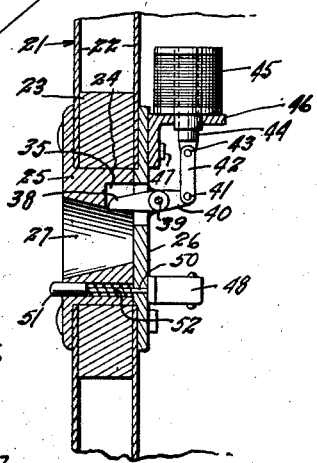
Inventors
REUBEN H FLEET,
ISAAC M LADDON
AND WILLIAM B. WHEATLEY
By Semmes & Semmes
Attorneys

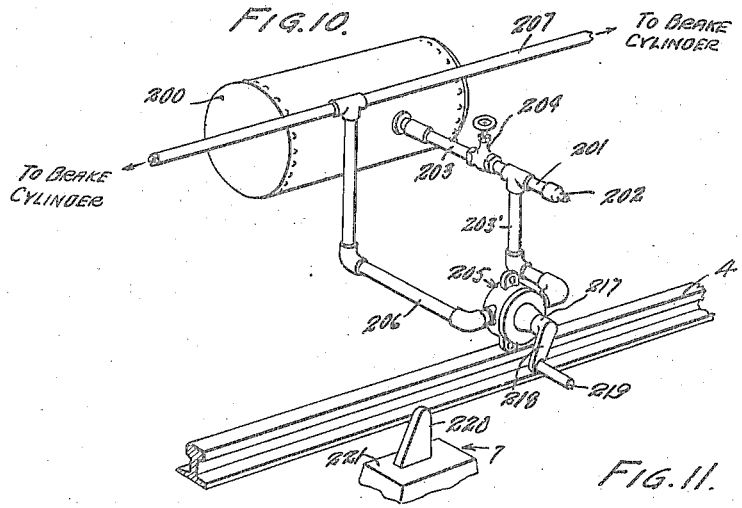
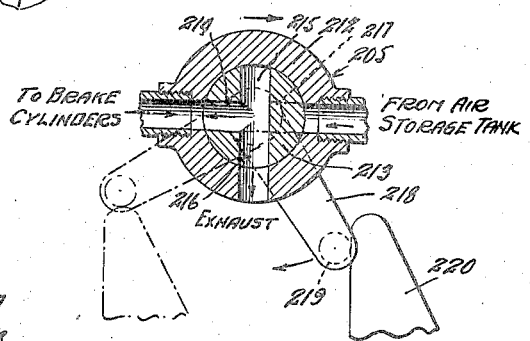
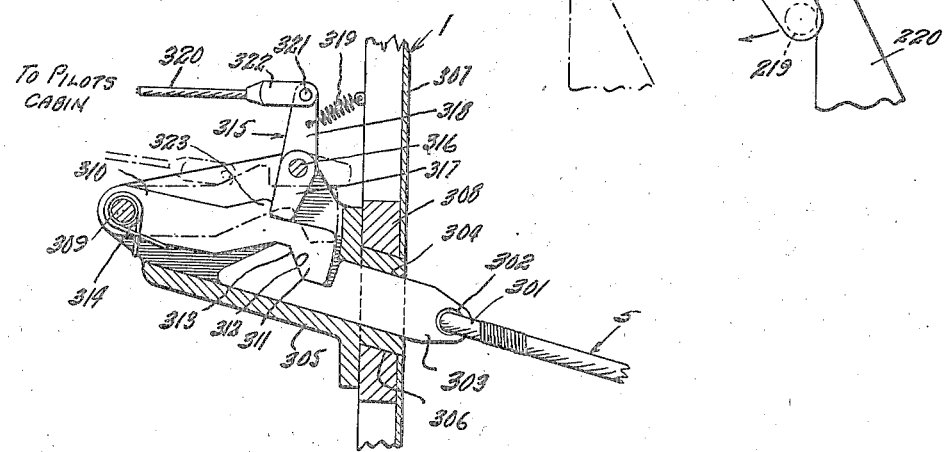

Patented Mar. 11, 1941

2,234,751

UNITED STATES PATENT OFFICE 2,234,751

TAKE-OFF CONTROL AND METHOD

Reuben H. Fleet, William B. Wheatley, and Isaac M. Laddon, San Diego, Calif.

Application April 24, 1937, Serial No. 138,844
Renewed July 30, 1940

8 Claims. (Cl. 244—63)

Our invention relates to the launching of airplanes, and more particularly to the launching of airplanes from moving vehicles.

This application is an improvement upon our copending application Serial No. 105,610, filed October 14, 1936.

Heretofore there have been no efficient means of control of takeoff of an airplane, other than the skill of the pilot.

Often a heavily laden plane will travel down a field, without rising in the air, a distance greater than it should travel before the brakes are applied. This mistake in judgment on the part of the pilot often results in accidents.

One object of the invention is to provide an automatic means for preventing takeoff after a certain distance of run if ample air speed has not been attained at a certain predetermined point in the run.

Another object of the invention is to provide air speed control for releasing an airplane from a vehicle on which it is mounted for launching.

Still another object of the invention is to provide an electrical circuit which controls the release of an airplane from a launching vehicle.

Yet another object of the invention is to provide an automatic means for applying the brakes on a vehicle carrying an airplane for launching at a certain point in its run.

A further object of the invention is to provide a novel form of hold-back mechanism by which the airplane is fastened at a point at the beginning of its run while the motors are being warmed up.

A still further object of the invention is to provide an air pressure switch for controlling the operating mechanism, such control depending on the air speed for which the device is set.

Yet a further object of the invention is to provide novel hold-down members by which an airplane is held to a launching vehicle.

Still a further object of the invention is to provide means for holding down the nose of an airplane during the takeoff run until the proper air speed is reached for the airplane to take off from the vehicle.

Another object of the invention is to permit the launching of airplanes without human attention, or at least without skilled handling during the takeoff run until after the plane leaves the vehicle. In this connection the completely automatic takeoff is especially valuable for flights controlled by robot pilots.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In order to make our invention more clearly understood, we have shown in the accompanying drawings means for carrying the same into practical effect without limiting the improvements in their useful applications to the particular constructions which, for the purpose of explanation, have been made the subject of illustration.

In the drawings:

Figure 1 is a diagrammatic view of a system employing my invention.

Figure 2 is a view in side elevation of a seaplane mounted on my supporting vehicle, part of the supporting vehicle being broken away to show the construction.

Figure 3 is a view in front elevation of a seaplane mounted on the supporting platform of the vehicle, showing the hold-down means by which the seaplane is held attached to the vehicle with its nose down.

Figure 4 is a detail view partly in section of the holding means for the seaplane.

Figure 5 is a detail sectional view showing the holding means removed from its socket in the wall of the seaplane.

Figure 10 is a detail perspective view of the control for the brake mechanism.

Figure 11 is a sectional view taken through our three-way control valve controlling the air to the brakes.

Figure 12 is a detail view partly in section of the attachment for the hold-back device whereby the airplane is attached to the hold-back cable.

Figure 6:
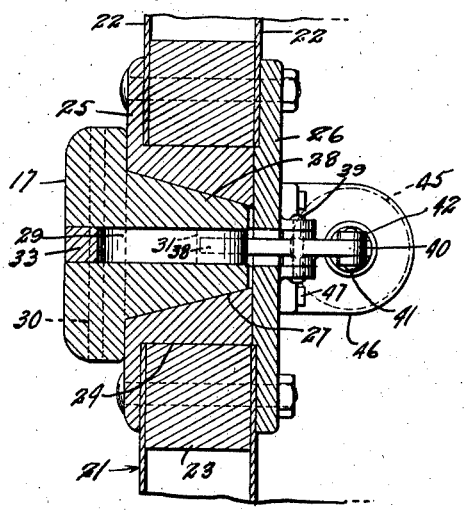
Figure 6 is a view taken along the line 6—6 of Figure 4.
Figure 7:
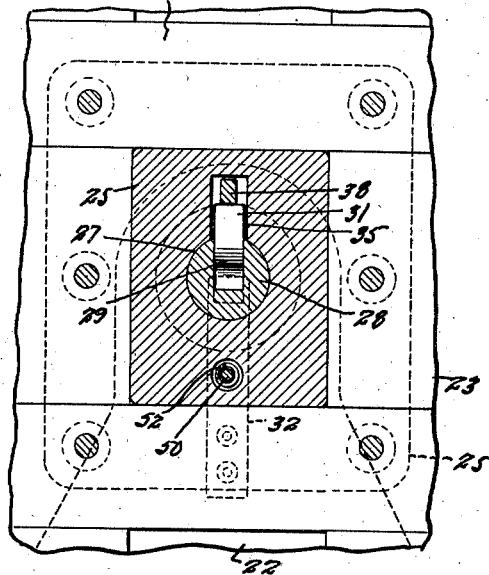
Figure 7 is a view taken along the line 7—7 of Figure 4.

In our system the airplane is held on the supporting vehicle with its nose held down, so that the airplane is in a substantially no-lift attitude. The elevators may be set to raise the nose of the airplane. The airplane is held at the end of the track which supports the launching vehicle by means of a cable.

The motors of the airplane are warmed up and are running full throttle, (or desired power output for takeoff), at which time the cable is released, allowing the motive power of the airplane to move the airplane and the vehicle down the track with increasing speed. The center of gravity of the airplane is, in general, located behind the point of pivoting of the cradle on which the airplane rests. The airplane is held, however, in the substantially no-lift attitude by reason of hold-down members which are attached to the supporting vehicle. When a proper air speed is reached, the hold-down members for the nose of the airplane are released, and the fact that the center of gravity of the airplane lies behind the pivot of the cradle on which the airplane rests, in addition to the fact that the elevators are set to raise the nose of the airplane, causes the airplane to quickly assume a substantially high angle of attack attitude, and the airplane will then quickly take off from the supporting vehicle.

At a certain point in its run, a trip at the side of the track automatically applies the brakes to the vehicle on which the airplane is supported. The location of this trip may be varied as required. If the airplane has not taken off from the vehicle when this point is reached, both airplane and vehicle are then arrested. However, if the airplane has taken off from the vehicle, the brakes will stop the vehicle. An arresting cable at the end of the run prevents overrunning of the vehicle beyond the end of the track.

Referring to the drawings, in Figure 1 we have shown an airplane 1 mounted on a platform 2 of a vehicle 3. The vehicle 3 is adapted to travel on tracks 4. In Figure 1 the airplane 1 is shown held by a cable 5 at one end of the track. The motors of the airplane are warmed up, and when they are running at desired power output the pilot releases the cable 5, as will be later described, and the airplane runs down the track, gaining speed. The elevators of the airplane are set in the position to raise the nose of the airplane. The nose is held down by holding means until the air speed is sufficient for the takeoff of the airplane from the vehicle. The section of the track on which this will normally occur is indicated in the drawings, Figure 1.

If the airplane takes off before the point in Figure 1 where it is indicated that the car brakes are applied, the vehicle 3 is merely arrested by the application of the brakes, overrunning being prevented by the arresting gear.

We have indicated the section of track on which takeoff usually occurs by the numeral 6, the point at which the car brakes are applied as numeral 7, and the arresting gear to prevent overrunning of the vehicle by the numeral 8.

If sufficient air speed is not attained for the takeoff of the airplane from the vehicle by the time the vehicle reaches the position indicated by the numeral 7, the car brakes are applied and the vehicle, with the airplane on it, is arrested.

Referring to Figure 2, I have shown the airplane 1 as a seaplane. It is adapted to be mounted in a cradle 9 which is pivoted on a shaft 10 mounted in supports 11 which are attached to the surface of the platform 2. On either side of the airplane, and pivoted at points 12 to the upper surface 2 of the vehicle 3, are holding members 13 which are adapted to hold the nose 14 of the airplane down, as indicated in Figure 2.

In Figure 2 I have shown an elevator 15 in a normal position. At the beginning of the run the elevator 15 is generally set in a position to raise the nose 14 of the airplane. The center of gravity of the airplane is somewhat back of the pivot shaft 10, tending to raise the nose and lower the tail, but the holding members 13 on either side of the plane prevent this from happening until they are released. Additionally, the setting of the elevators when a substantial forward speed is obtained tends to raise the nose 14.

In Figures 3 to 7 inclusive are shown the details of the holding means for holding the nose 14 of the airplane in the substantially zero angle of attack attitude, or no-lift attitude. Each holding member 13 comprises a bifurcated construction comprising arms 16 which are joined together at their top at 17 and which are pivoted at their bottom at points 12 on supports 18 carried on the upper surface or platform 2 of the vehicle 3.

Each of the arms 16 is provided with an outwardly projecting lug 19 which is adapted to contact a base 20 formed on each of the supports 18. The lugs 19, in contacting the base 20, hold the holding members 13 in the position indicated in Figure 5. This position permits the airplane to take off from the platform 2 while at the same time the holding members 13 are prevented from falling to a position where they might encounter obstacles on the side of the track.

On either side 21 of the hull of the flying boat 1 we have provided a double wall construction 22. A base member 23 on either side of the hull encircles an aperture 24 in which is mounted, on the outside of either side of the hull, a plate 25. On the inside of the aperture 24 on either side of the hull is mounted a holding plate 26. Plate 25 is held to the holding plate 26 by bolts or any other suitable device. Each plate 25 is provided with a frustoconical aperture 27 in which is adapted to fit a frustoconical male member 28 carried at the top 17 of each holding member 13.

Each frustoconical male member 28 comprises a movable section 29 which is pivoted at 30 in the top 17. Each section 29 is provided with a locking nose 31.

A spring 32 mounted on the top 17 of each holding member 13 lies against a lip 33. Each spring 32 tends to hold each member 29 in the position shown in Figure 4.

In the position shown in Figure 4, each locking nose 31 projects into an aperture 35 formed in the member 25 and holds the holding member firmly in place, locking the nose 14 of the airplane 1 in the down or substantially zero angle of attack attitude.

In order to release each holding member 13 from its locking engagement with the hull of the flying boat, we have provided a trip mechanism which pushes down on each locking nose 31 to release it from its respective aperture 35 in each member 25. Each holding member 13 is pushed over into the position shown in Figure 5 by means of springs 36 attached at 37 on the top 17 of the holding members. The springs 36 push against the outer faces of the members 25 to push the holding members 13 away from their holding position upon release of the locking nose 31 of the male member 28.

Each locking nose 31 is adapted in its locking position to contact the lower side of a lever arm 38 pivoted at 39 of each holding plate 36. Each lever has an arm 40 which is pivoted at 41 to a connecting link 42 which is pivoted at 43 to the core 44 of a solenoid. The solenoid winding 45 is shown mounted on a supporting bracket 46 which is attached at 47 to each plate 26.

When the solenoid winding 45 is energized, it pulls up on the solenoid core or armature 44, which rocks the lever on the pivot 39 to cause the arm 38 to assume the position shown in Figure 5 which pushes the movable pivoted section 29 of the male member 28 down against the tension of the spring 33 and permits the frustoconical male member 28 to come out of engagement with the frustoconical aperture 35.

At the same time, a cut-out switch has been operated to cut out the flow of electricity to the operating coils 45 of the solenoids. On each side 21 of the hull of the flying boat, we have mounted on plates 26 a casing 48 of the cut-out switch, the details of which are not shown, but which is diagrammatically illustrated in Figure 8 at 49.

There is adapted to slide into the casing 48 an operating plunger 50 having a head 51 and a spring 52 which tends to urge the head 51 into the position shown in Figure 5. When the holding member 13 is in the engaging position shown in Figure 4, spring 52 is compressed, and the cut-out switch 49 permits the passing of current. With the parts in the position shown in Figure 5, the cut-out switch does not permit the passing of current, thus saving drain on the operating battery or other source of electromotive force used on the airplane and the over-heating of the coils 45.

Figure 8:
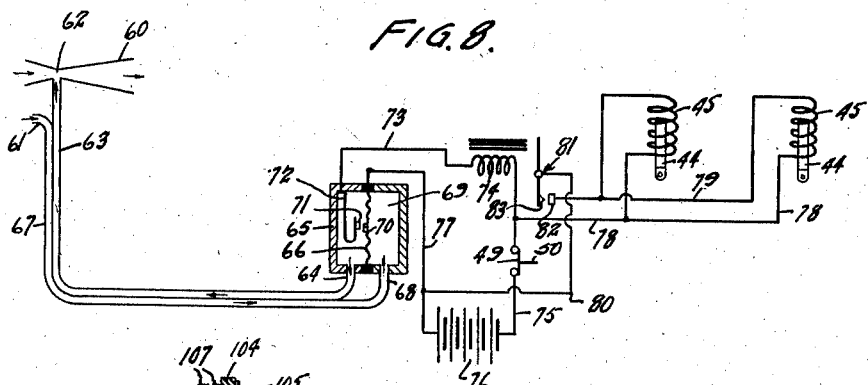
Figure 8 is a diagrammatic view of the control circuit for releasing the seaplane from the supporting vehicle.
Figure 9:
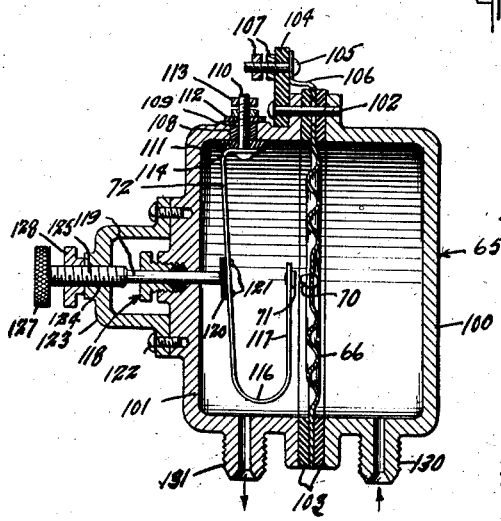
Figure 9 is a sectional view taken through our control switch operated by air speed.

The operation of the release of the holding members 13 is accomplished by means of air speed (see Figures 8 and 9). On the front of the airplane are mounted a Venturi tube 60 and a pressure tube 61. The Venturi tube 60 is connected at its throat 62 with a pipe 63 which connects at 64 to one side 65 of an airtight container having a flexible diaphragm 66 mounted in the middle. The pressure tube 61 is connected by means of a tube 67 and a connection 68 to the other side 69 of the airtight container 65. Movement of the tubes through the air causes an aspirating effect to be produced by the Venturi tube 60 which produces a suction at the throat 62. The air passes through the venturi due to the motion of the airplane in the direction indicated by the horizontal arrows, Figure 8. Air is aspirated, as indicated by the arrows, through the tube 63 from air chamber 65, reducing the pressure on one side of the flexible diaphragm 66. At the same time, air is forced down the pressure tube 61, as indicated by the arrows, through tube 67 into the pressure side 69 of the chamber 65.

It is to be understood that instead of pressure and Venturi tubes—pitot (pressure) and static tubes—as at present used to actuate air speed indicators could be used.

A reduction of pressure on one side of the diaphragm 66 and an increase of pressure on the other causes the diaphragm 66 to flex.

The diaphragm 66 carries a contact 70 which is adapted to contact with a contact 71 carried on the spring 72. When this contact is made between contacts 70 and 71, a shunt circuit is closed, which causes energization of the coils 45 of the solenoids to cause release of the male members 28 in their sockets 27 to release the holding members 13 from their holding function on the airplane.

The operation of the circuits will be apparent from an inspection of Figure 8. The closing of contacts 70 and 71 closes a shunt circuit comprising leads 73, high resistance coil 74, cut-out switch 49, lead 75, to battery 76, through lead 77 attached to the other pole of the battery 76, to contact 70.

Instead of battery 76, any other suitable source of electromotive force may be employed. Mechanical, hydraulic, or pneumatic devices, instead of electrical, could be employed to give the same result.

The circuit just described is a shunt circuit and, because of the high resistance of the coil 74, a small amount of current traverses this circuit. The circuit is opened on the opening of cut-out switch 49. The main circuit comprises a lead 78 connected to lead 75 and a lead 79. The coils 45 of the main operating solenoids are connected across the leads 78 and 79. Through a lead 80 a relay 81 operated by energization of the coil 74 in the shunt circuit is connected to lead 79. When the relay is operated to close contacts 82 and 83, a circuit is completed from the source of electromotive force 76 through the coils 45 of the operating solenoids.

Thus, when a sufficiently high air speed is attained, automatically the circuits just described cause energization of the solenoid windings 45 which raise the solenoid armatures 44 to release male members 28 from frustoconical sockets 27. The springs 36 cause the holding members 13 to be pushed away from the sides 21 of the hull of the flying boat, and the airplane is free to take off from the cradle. The cradle 9 is rocked back on its pivot 10 by reason of the fact that the center of gravity of the airplane is behind the pivot 10 and also because of the setting of the elevators 15 to raise the nose 14. Since flying speed has been attained before the nose 14 rises, the airplane will quickly take off from the cradle and leave the launching vehicle 3.

The details of the construction of the airtight container 65 will now be given. Referring particularly to Figure 9, it will be seen that the airtight container 65 comprises two halves 100 and 101 which are joined together by suitable screws 102, only one of which is shown in the drawings. The flexible diaphragm 66 is held between airtight packing rings 103 which lie on either side of the periphery of the flexible diaphragm 66. The screws 102 hold the two halves 100 and 101 together, and also hold the flexible diaphragm 66 in place.

The top screw 102 is adapted to hold an insulating support 104 which carries a screw 105 which is electrically connected through a lead 106 to the flexible diaphragm 66. The screw 105 carries nuts 107 to which is adapted to be attached lead 77 (see Figure 8).

The half of the casing 101 is provided at its top with an aperture 108 which has an airtight insulating liner 109 through which passes a screw 110. The head of the screw 110 contacts against an insulating washer 111 on the inside of the casing 65. The outer end of the screw 110 has mounted on it an insulating washer 112 and connector nuts 113 to which are adapted to be attached lead 73 (see Figure 8).

Held against the insulating washer 111 on the inside of the casing by the head of the screw or bolt 110 is the bent-over end 114 of the flexible resilient metallic strip 72 which is bent at 116 to form a flexible end 117 that carries the contact 71.

The half 101 of the metallic casing 65 is provided with a packing gland indicated generally by the numeral 118, through which is adapted to reciprocate a rod 119. One end of the rod 119 contacts an insulating member 120 which is attached at 121 to the flexible metallic strip 72. Attached by screws 122 to the outside of the half 101 of the airtight casing 65 is a support spider 123 which is screw threaded at 124 to receive a screw threaded section 125 of the rod 119 which has a knurled adjusting head 127. A lock nut 128 on the screw 126 is adapted to hold the rod 119 in a desired adjusted position so as to increase or decrease the distance between contacts 71 and 70 to adjust the device for varying desired air speeds.

Pipe 68 from the air pressure tube 61 is adapted to be attached to a connection 130 to the half 100 of the airtight casing 65, and to a connection 131 is adapted to be attached pipe 64 from the Venturi tube 60.

The functioning of this apparatus has been previously given in connection with the description of the circuit (Figure 8). It is obvious that, by adjusting the position of the rod 119, the device may be set for varying air speeds.

The method of applying the brakes on the vehicle at a certain predetermined point in the run will now be described. Referring briefly to Figure 1, it has been explained that at point 7 the brakes are applied on the vehicle. In Figure 2 and Figures 10 and 11 is shown the mechanism for applying the brakes on the vehicle. There is provided an air tank 200 which is adapted to receive air under pressure from inlet pipe 201 having a one-way filling valve 202. The pipe 201 communicates with a pipe 203. There is a shut-off valve 204 provided in the pipe 203. Air under pressure can be sent in to the tank 200 through valve 202. Connected to pipe 203 is a pipe 203' which communicates with an operating valve which is indicated generally by the numeral 205. The operating valve also communicates through a pipe 206 with a pipe 207 which goes to the brake cylinders.

The brake cylinders are located at either end of the vehicle 3 and are connected to the pipe 207 through pipe 208. The brake cylinders we have indicated in Figure 2 by the numeral 209. Through suitable operating linkage connections indicated generally by the numeral 210 the brake shoes 211 may be applied on admitting air to the brake cylinders 209. The details of this construction are shown in our copending application Serial No. 112,803, filed November 25, 1936, and it is not thought necessary to repeat the detailed description therein contained.

The valve 205 comprises a valve casing 212 and a rotatable member 213 therein which has a three-way connection, namely, a duct 214, a duct 215 and a duct 216. Attached to the rotatable member 213 is a connecting shaft 217 which is provided with a crank 218 and a contact member 219.

The contact member 219 is adapted to strike a trip 220 set in a supporting base 221. The trip 220 is located at the point designated by numeral 7 in Figure 1. As the vehicle passes the station 7, the trip 220 strikes contact member 219 and rotates the rotatable member 213 of the valve.

With the parts shown in the position indicated in solid lines in Figure 11, the brakes exhaust through ducts 214 and 216. With the parts shown in the position indicated in dotted lines in Figure 11, air passes from the container 200 through duct 215 and duct 216 to pipe 206, thence to pipe 207 and thence to brake cylinders 209 to apply the brakes.

Thus, as the launching vehicle 3 passes point 7, the brakes are applied.

Full application of brakes might slide the wheels—causing loss of braking efficiency and wearing flat spots on the wheels, though automatic control of brake application (as used on new streamlined trains) could be used. Such automatic control works on deceleration forces on the vehicle.

In order to insure the stopping of the vehicle, we have provided cable engaging members 223 at either end of the vehicle 3. These members comprise a throat construction 224 in which the cable 8 is adapted to be guided, and a pivoted catch 225 which is pushed aside by the cable 8 as it enters the throat 224 and which falls in position behind the cable after the cable has once passed into the throat 224. Thus, if the brakes have not stopped the vehicle, which may or may not support the airplane at this point in the run, depending upon whether or not the airplane has taken off from the launching vehicle, the vehicle will be arrested by the arresting cable 8 at the end of the run.

The details for applying brakes to the arresting cable are well known, and it is not believed necessary to describe them. Details of one form of arresting cable construction are shown in our copending application Serial No. 105,611, filed October 14, 1936.

The hold-down mechanism for holding the airplane in the beginning of the run will now be described. Referring to Figure 1, we have shown that there is a cable 5 which holds the airplane at the beginning of the run until the motors are running full throttle, at which time the pilot releases the cable 5 from the airplane, and the airplane and the launching vehicle, preferably only under the power of the motive power plant of the airplane, proceed down the rail track 4.

The cable 5 is attached to an anchor member 300 which may be mounted between the rails of the rail track 4. The cable 5 has a loop 301 which is adapted to pass through an aperture 302 in a male member 303 which is adapted to slide in a slideway 304 formed in a support member 305 which fits within an aperture 306 formed in the bottom 307 of the fuselage. The aperture 306 is braced by means of a bracing member 308 which acts as a support for the strain imposed by forces acting through the support member 305.

Pivoted on the support member 305 on a pivot 309 is a fastener 310. The fastener 310 is provided with a catch 311 having a sloping surface 312 which is adapted to engage a sloping surface 313 formed on the end of the male member 303.

A coil spring 314 is adapted to urge the fastener 310 in the up, or disengaging, position. The slope of the surfaces 312 and 313 is such as to tend to move the fastener 310 in the up, or disengaged, position. In order to hold the fastener 310 in the down, or engaging, position, there is provided a release member 315 which is pivoted on a pivot 316 supported by the socket 305. One arm 317 of the release member 315 is adapted to bear against the top of the fastener 310.

The other arm 318 of the release member 315 is held in the position indicated in solid lines in Figure 12 by means of a spring 319 which is attached to the arm 318 and to the fuselage 307. A cable 320 is pivotally attached at 321 through a suitable connection 322 to the arm 318 of the release member 315.

A stop 323 prevents the spring 319 from moving the release member beyond the position shown in solid lines in Figure 12. Upon the pilot pulling on cable 320, the release member 315 is pivoted on its pivot 316 against the tension of the spring 319 to move the arm 317 out of engagement with the top of the fastener 310. The fastener 310 is raised to the position shown in dotted lines in Figure 12 under the tension of the spring 314 and because of the forces exerted by the engaging surfaces 312 and 313. The airplane is then freed from the hold-down mechanism and can proceed on its run.

In operation, the airplane, with its nose held down in the substantially no-lift attitude, is resting on the launching vehicle 3 at the beginning of the run, as indicated in Figure 1. The cable 5 holds the airplane and the supporting vehicle from forward movement while the engines are being warmed up and until they are running full throttle. The elevators 15 are set to lift the nose of the airplane, but are prevented from functioning until the nose of the airplane is no longer held down by the holding members 13.

When the motor is running full throttle, or at desired power output, the pilot pulls on cable 220 and releases the airplane and vehicle which, under the power of the motive power plant of the airplane, runs down the rail tracks 4 until sufficient air speed is attained for the closing of contacts 70 and 71.

The closing of these contacts releases the holding members 13, as previously described, and permits the airplane to rock back on the cradle 9 and to quickly take off from the launching vehicle. At the same time, cut-out switch 49 is opened to prevent drain on the batteries and overheating of the coils 45.

As the vehicle passes the trip mechanism located at 7 along the track, the brakes are applied and, in case the vehicle is still moving, the arresting cable 8 will stop the vehicle.

If sufficient air speed has not been attained during the run and before the point 7 is reached on the track, the nose of the airplane will be held down in the position indicated in Figure 2 and the airplane cannot take off from the supporting vehicle.

Thus, automatic control of takeoff is substituted for the pilot's judgment, and safety factors are introduced into the launching of airplanes which have never heretofore been possible.

With our invention no human attention is required to safely get the aircraft into the air; in fact if a robot pilot such as the Sperry automatic airplane pilot were used on the airplane, no human need even be aboard the aircraft (this might be desirable in time of war in the case of a very dangerous mission where the airplane would be expended to accomplish the mission). Also in time of war, planes might be launched with our invention, manned by crews not sufficiently skilled to make safe takeoffs in the normal way, yet who could guide the plane in flight, and could probably land the plane, which would be much lighter after returning from a mission, without damaging it.

The arrangement of the device to "automatically launch" an airplane would be such that the relation of the supports and the center of gravity would cause the aircraft to pivot to the takeoff attitude when the forward support was released. With the elevators set for normal climb, or if the automatic (robot) pilot was set for a climbing attitude, then when the forward release was disconnected the plane would "automatically take off."

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A hold-down mechanism for holding an airplane to a launching vehicle comprising a pair of holding means carried by the vehicle, a pivoted element on each holding means adapted to fit in an aperture provided on each side of the nose of the airplane, and an electrical automatically operated trip for each pivoted element to move the pivoted element to release the holding means from the vehicle.

2. In a vehicle for launching an airplane, a body, a rockable cradle on which the airplane is adapted to rest, a pair of arms mounted on the body on opposite sides of the airplane at a point forward of the center of gravity of the airplane and a pivoted member on each arm adapted to fit within an aperture provided in each side of the plane so as to maintain the airplane in a substantially no-lift attitude.

3. In a vehicle for launching an airplane, a body, a rockable cradle on which the airplane is adapted to rest, a pair of arms mounted on the body on opposite sides of the airplane at a point forward of the center of gravity of the airplane, a pivoted member on each arm adapted to fit within an aperture provided in each side of the plane so as to maintain the airplane in a substantially no-lift attitude, and means to move the pivoted member to release the arms from the airplane.

4. In a vehicle for launching an airplane, a body, a rockable cradle on which the airplane is adapted to rest, a pair of arms mounted on the body on opposite sides of the airplane at a point forward of the center of gravity of the airplane, a pivoted member on each arm adapted to fit within an aperture provided in each side of the plane so as to maintain the airplane in a substantially no-lift attitude, and an electrically operated trip for each pivoted member to move the pivoted member to release the arms of the airplane.

5. A hold down mechanism for holding an airplane to a launching vehicle comprising a pair of holding means carried by the vehicle, a pivoted element on each holding means adapted to fit in an aperture provided on each side of the airplane at a point forward of the center of gravity of the airplane, and an electrically operated trip for each pivoted element to move said pivoted element to release the holding means from the airplane.

6. A hold down mechanism for holding an airplane to a launching vehicle comprising a pair of arms mounted on the vehicle on opposite sides of the airplane at a point forward of the center of gravity of the airplane, a pivoted element on each arm adapted to fit within an aperture provided in each side of the airplane, and an electrically operated trip for each pivoted element to move the pivoted element to release the pivoted element from the apertures.

7. In a vehicle for launching an airplane, a body portion, a cradle on which the airplane is adapted to rest, a pair of holding means carried by the body on opposite sides of the airplane at a point forward of the center of gravity of the airplane, a pivoted member on each arm adapted to fit within an aperture provided in each side of the plane so as to maintain the airplane in a substantially no-lift attitude, and means actuated by the air speed to release the arms from the airplane.

8. A hold down mechanism for holding an airplane to a launching vehicle comprising a pair of arms carried by the vehicle, a pivoted element on each arm adapted to fit in an aperture provided on each side of the nose of the airplane, an electrically operated trip for each pivoted element for moving the pivoted element to release the arms from the airplane, and means operated by the air speed to actuate the electrically operated trip.

REUBEN H. FLEET.
WILLIAM B. WHEATLEY.
ISAAC M. LADDON.